(12) United States Patent 
Dai et al.

(10) Patent No.: US 12,574,802 B2 
(45) Date of Patent: Mar. 10, 2026

(54) RECONFIGURABLE INTELLIGENT SURFACE (RIS) SCHEDULING

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US); Junyi Li, Fairless Hills, PA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 683 days.

(21) Appl. No.: 17/647,547

(22) Filed: Jan. 10, 2022

(65) Prior Publication Data

US 2022/0232422 A1 Jul. 21, 2022

Related U.S. Application Data

(60) Provisional application No. 63/139,663, filed on Jan. 20, 2021.

(51) Int. Cl.
| | |
|---|---|
| *H04W 28/18* | (2009.01) |
| *H04W 72/0446* | (2023.01) |
| *H04W 72/1268* | (2023.01) |

(52) U.S. Cl.
CPC ....... *H04W 28/18* (2013.01); *H04W 72/0446* (2013.01); *H04W 72/1268* (2013.01)

(58) Field of Classification Search
CPC ............ H04W 28/18; H04W 36/0094; H04W 72/0446; H04W 72/1268; H04W 72/0453; H04B 7/04013; H04B 7/026; H04B 7/0617; H04B 7/14; H04B 7/145; H04B 7/15; H04B 7/06952; H04B 7/06966; H04B 7/088; H04B 7/2612; H04B 7/0626; Y02D 30/70
See application file for complete search history.

(56) References Cited

U.S. PATENT DOCUMENTS

| | | | | |
|---|---|---|---|---|
| 11,848,709 B2* | 12/2023 | Medra et al. | ........ | H04B 7/0617 |
| 2021/0302561 A1* | 9/2021 | Bayesteh | ................ | G01S 13/42 |
| 2022/0014935 A1* | 1/2022 | Haija et al. | .......... | H04W 16/28 |
| 2022/0052764 A1* | 2/2022 | Medra | .................. | H04B 10/614 |
| 2022/0216909 A1* | 7/2022 | Bengtsson et al. | .. | H04B 7/0617 |

(Continued)

*Primary Examiner* — Romani Ohri 
(74) *Attorney, Agent, or Firm* — Norton Rose Fulbright US LLP

(57) ABSTRACT

Reconfigurable intelligent surface (RIS) scheduling provided with respect to wireless communication networks is described. A base station or other network entity may serve as a central node to accommodate RIS sense and/or control requests from user equipments (UEs). A RIS scheduling protocol according to some aspects may provide a technique for avoiding potential collision at the RIS sense and/or control phases of operation with respect to RISs deployed in a wireless communication network. Using RIS scheduling, wireless communication networks may avoid or otherwise mitigate situations in which multiple sensing signals negatively impact RIS detection procedures, multiple control signals causing signal processing problems and/or control issues, and/or interference results from un-coordinated control of multiple RISs. Other aspects and features are also claimed and described.

30 Claims, 8 Drawing Sheets

(56)          References Cited

U.S. PATENT DOCUMENTS

| | | | |
|---|---|---|---|
| 2023/0047993 A1* | 2/2023 | Jian | H04W 72/121 |
| 2023/0074103 A1* | 3/2023 | Liu | H04B 7/04013 |
| 2023/0107283 A1* | 4/2023 | Park | H04W 48/08 |
| | | | 370/329 |
| 2023/0246674 A1* | 8/2023 | Astrom et al. | H04B 7/04013 |
| 2023/0258759 A1* | 8/2023 | Wang et al. | G01S 5/02 |
| 2023/0327714 A1* | 10/2023 | Baligh | H04B 7/088 |
| | | | 375/262 |
| 2024/0007147 A1* | 1/2024 | Sahraei et al. | H04B 7/0695 |
| 2024/0014860 A1* | 1/2024 | Wang | H04B 7/026 |

* cited by examiner

700

701   Receive a RIS request from a UE

702   Determine an aspect of utilization by the UE of a subject RIS of the RIS request 703   Transmit a RIS response to the UE in accordance with the determination

600

601   Transmit a RIS request to a base station

602   Receive a RIS response from the base station

603   Interact with a subject RIS of the RIS request in accordance with the RIS response

RECONFIGURABLE INTELLIGENT SURFACE (RIS) SCHEDULING

CROSS-REFERENCE TO RELATED APPLICATIONS

This application claims the benefit of U.S. Provisional Patent Application No. 63/139,663, entitled, "RECONFIGURABLE INTELLIGENT SURFACE (RIS) SCHEDULING," filed on Jan. 20, 2021, which is expressly incorporated by reference herein in its entirety.

TECHNICAL FIELD

Aspects of the present disclosure relate generally to wireless communication systems, and more particularly, to wireless communication systems utilizing one or more reconfigurable intelligent surfaces (RIS s). Certain embodiments of the technology discussed below can enable and provide RIS scheduling.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may, for example, be performed by a use equipment (UE). The method may include transmitting a reconfigurable intelligent surface (RIS) request to a base station and receiving a RIS response from the base station. The method may also include interacting with a subject RIS of the RIS request in accordance with the RIS response.

In an additional aspect of the disclosure, an apparatus configured for wireless communication is provided. The apparatus includes at least one processor, and a memory coupled to the at least one processor. A UE may, for example, comprise the apparatus. The at least one processor may be configured to transmit a RIS request to a base station and receive a RIS response from the base station. The at least one processor may also be configured to interact with a subject RIS of the RIS request in accordance with the RIS response.

In an additional aspect of the disclosure, an apparatus configured for wireless communication is provided. A UE may, for example, comprise the apparatus. The apparatus may include means for transmitting a RIS request to a base station and means for receiving a RIS response from the base station. The apparatus may also include means for interacting with a subject RIS of the RIS request in accordance with the RIS response.

In an additional aspect of the disclosure, a non-transitory computer-readable medium storing instructions for wireless communication is provided. The instructions, when executed by a processor, may cause the processor to perform operations including transmitting a RIS request to a base station and receiving a RIS response from the base station. The instructions may also cause the processor to perform operations including interacting with a subject RIS of the RIS request in accordance with the RIS response.

In an additional aspect of the disclosure, a method of wireless communication is provided. The method may, for example, be performed by a base station. The method may include receiving a RIS request from a UE and determining an aspect of utilization by the UE of a subject RIS of the RIS request. The method may also include transmitting a RIS response to the UE in accordance with the determination.

In an additional aspect of the disclosure, an apparatus configured for wireless communication is provided. A base station may, for example, comprise the apparatus. The apparatus includes at least one processor, and a memory coupled to the at least one processor. The at least one processor may be configured to receive a RIS request from a UE and determine an aspect of utilization by the UE of a subject RIS of the RIS request. The at least one processor may also be configured to transmit a RIS response to the UE in accordance with the determination.

In an additional aspect of the disclosure, an apparatus configured for wireless communication is provided. A base station may, for example, comprise the apparatus. The apparatus may include means for receiving a RIS request from a UE and means for determining an aspect of utilization by the UE of a subject RIS of the RIS request. The apparatus may also include means for transmitting a RIS response to the UE in accordance with the determination.

In an additional aspect of the disclosure, a non-transitory computer-readable medium storing instructions for wireless communication is provided. The instructions, when executed by a processor, may cause the processor to perform operations including receiving a RIS request from a UE and determining an aspect of utilization by the UE of a subject RIS of the RIS request. The instructions may also cause the processor to perform operations including transmitting a RIS response to the UE in accordance with the determination.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
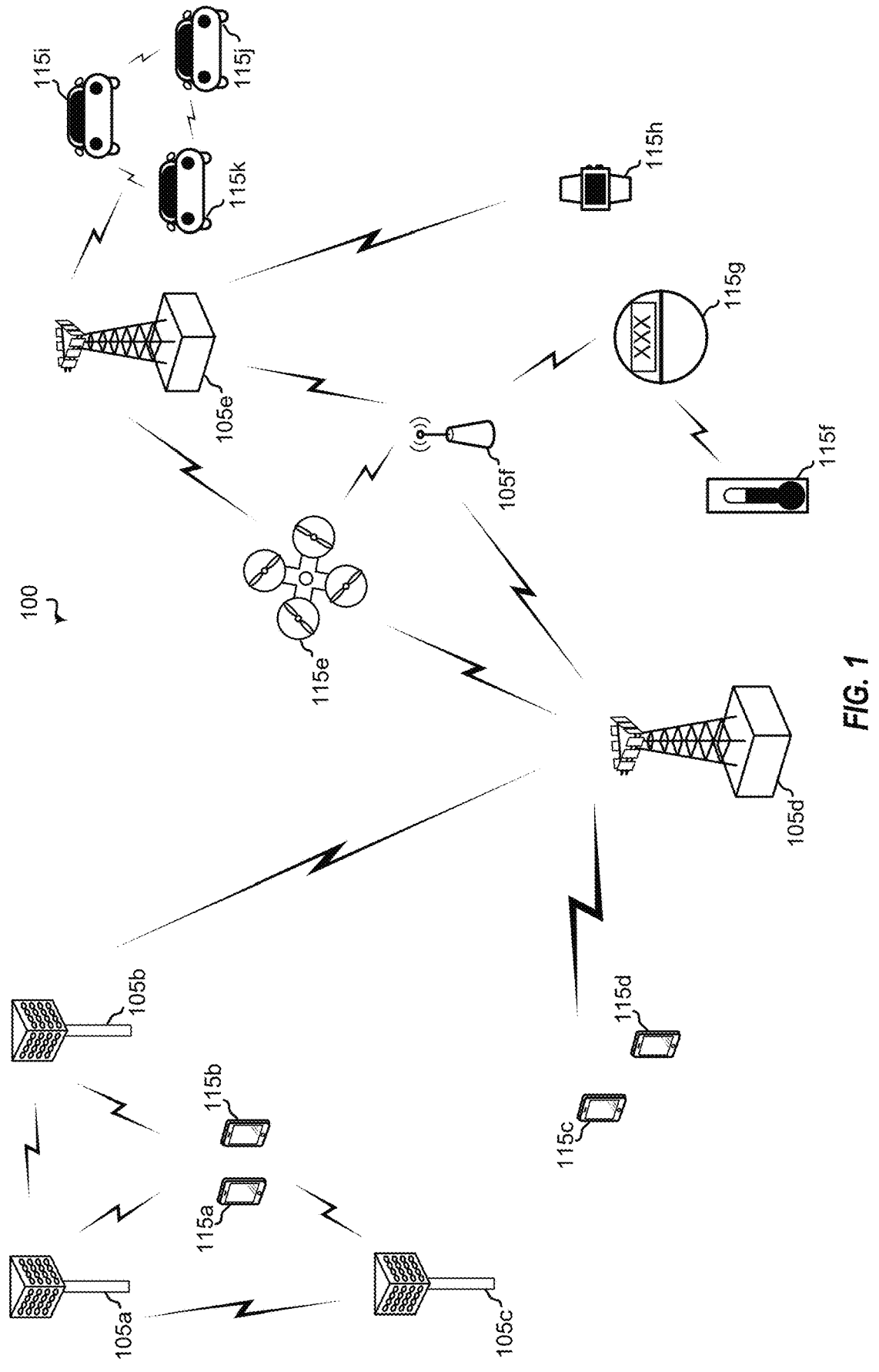
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Wireless communication networks have been widely deployed for providing and facilitating communication between two or more wireless devices. In operation of a wireless communication network subscriber equipment, also known as user terminals or user equipments (UEs), may communicate with various network entities, such as base stations, via wireless links for facilitating data communication within and/or via the wireless communication network. In addition to communicating with base stations and/or other network entities of a wireless communication network, UEs may implement direct communication links with other UEs. For example, UEs may utilize sidelinks with respect to one or more other UEs to provide direct communication links between UEs.

Irrespective of the particular devices (e.g., base station and UE, UE and UE, etc.) communicating within a wireless communication network, the wireless signals may sometimes experience less than ideal signal propagation conditions. For example, terrain topology, man-made structures, foliage and other live growth, etc. may prevent or otherwise hinder line of sight signal propagation between wireless communication devices, resulting in a poor or undesirable wireless communication channel between such devices. Accordingly, various forms of devices, such as signal repeaters, have been developed for facilitating satisfactory wireless links within wireless communication networks.

Reconfigurable intelligent surfaces (RIS s) are a recent technology being explored for use with respect to facilitating wireless links within wireless communication networks. A RIS may be provided, for example, when an environmental object (e.g., a building, a wall or fence, a signboard, a bridge abutment, etc.) is coated with man-made intelligent surfaces of configurable electromagnetic materials and electronic circuits that enable control of the surface. The surface presented by a RIS, made of electromagnetic material, is capable of customizing the propagation of the radio waves impinging upon it. For example, RISs may be controlled to change the reflective direction of wireless signals impinging upon a RIS deployed within a wireless communication network. Thus, RISs may enable a network operator to essentially provide control of the wireless medium by sculpting the very medium that comprises the network.

In a wireless communication network implementing RIS technology, it is expected that there may be multiple RISs and/or multiple UEs eligible to use RISs in the same cell. Multiple UEs in the same cell may thus try to sense and/or control the same RIS at same time, causing a collision. Multiple sensing signals reflected by a RIS and received at a UE has the potential to impede or otherwise negatively impact the RIS detection procedure. Further, multiple control signals received by a RIS may cause signal processing problems and/or control issues with respect to the RIS. Multiple RIS s controlled in an un-coordinated manner may induce interference.

The present disclosure provides systems, apparatus, methods, and computer-readable media that support RIS scheduling with respect to wireless communication networks. In some examples a RIS scheduling protocol may be implemented in a centralized manner, wherein one or more network entities may serve as central nodes (e.g., providing control, management, coordination, etc. with respect to multiple other entities, such as may include multiple UEs and/or multiple RISs) to accommodate RIS requests from UEs with respect to one or more RISs. In accordance with some aspects of the present disclosure, a base station or other network entity may serve as a central node to accommodate RIS sense and/or control requests from UEs. In operation according to some examples, a RIS scheduling protocol implemented in accordance with concepts of the present disclosure provides a technique for avoiding potential collision at the RIS sense and/or control phases of operation with respect to RISs deployed in a wireless communication network. Using such RIS scheduling, wireless communication networks may avoid or otherwise mitigate situations in which multiple sensing signals negatively impact RIS detection procedures, multiple control signals causing signal processing problems and/or control issues, and/or interference results from un-coordinated control of multiple RISs.

From the foregoing it can be appreciated that this disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The $3^{rd}$ Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of Everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
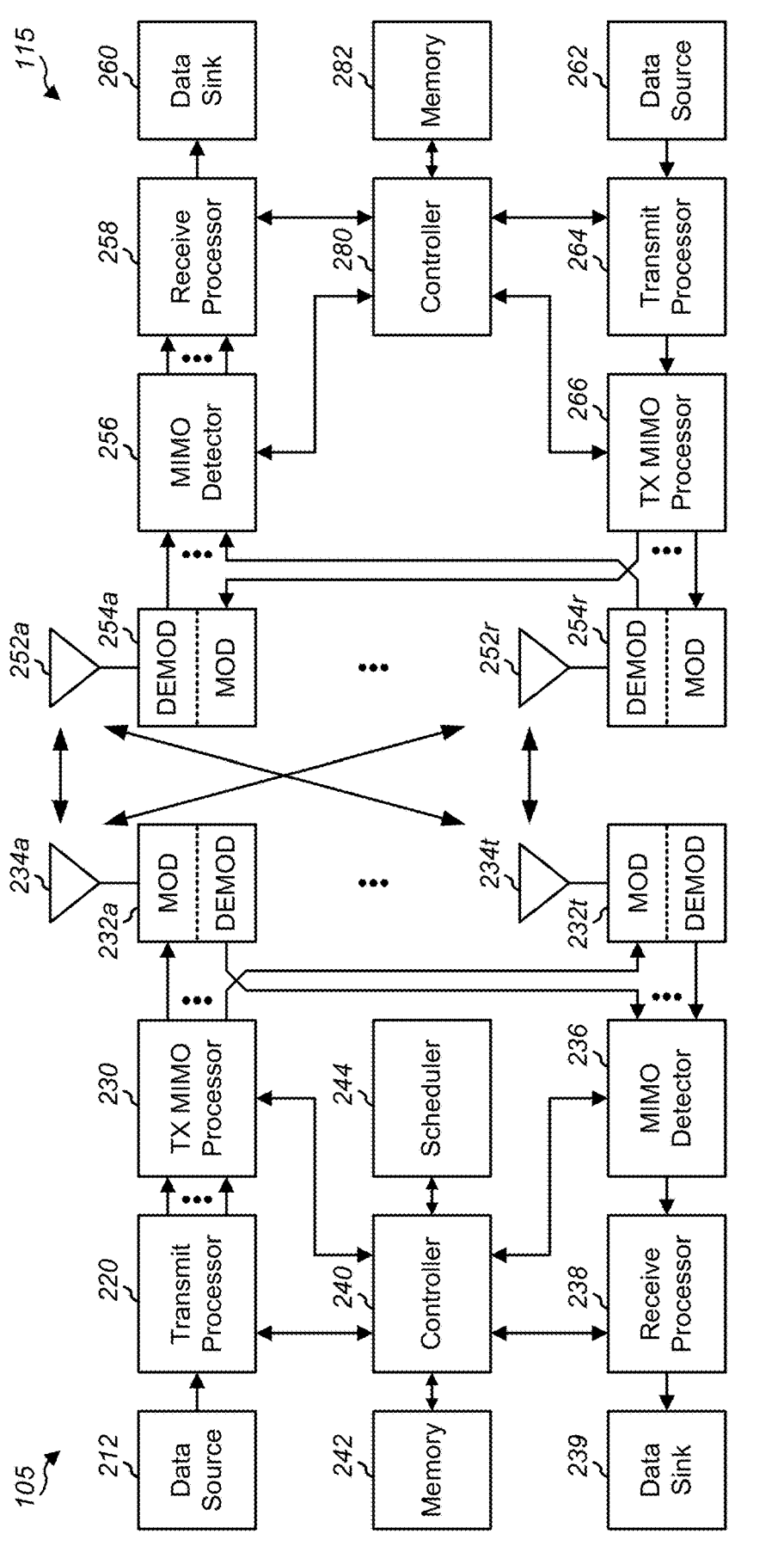
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators (MODs) 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor

238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In addition to communicating with the network (e.g., one or more base stations 105), UEs 115 may implement side-links (i.e., communication link directly between UEs) with respect to one or more other UEs. For example, as shown in FIG. 1, UE 115i may communicate directly with base station 105e (e.g., using a UE to UMTS (Uu) interface). Further, UE 115i may communicate directly with UE 115j via a sidelink (e.g., using a UE to UE interface such as a PC5 interface of a mesh network).

Figure 3:
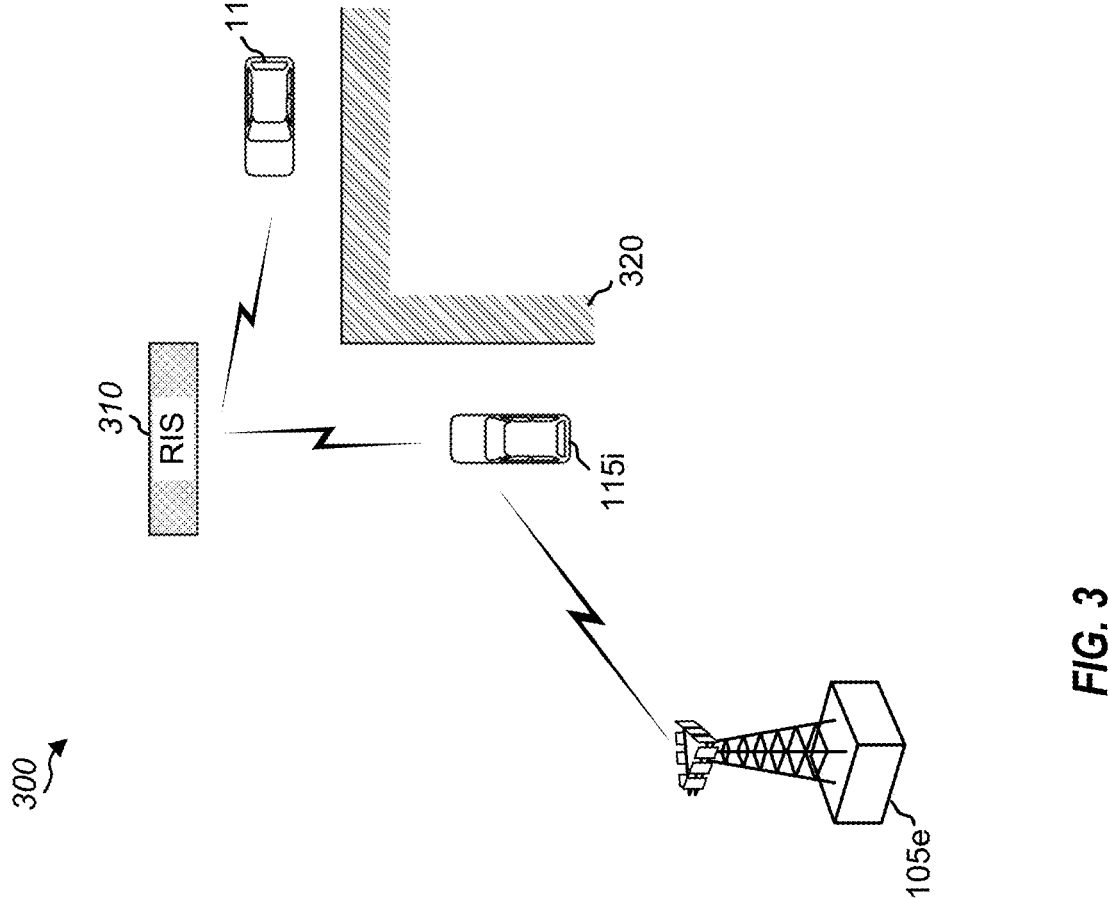
FIG. 3 is a block diagram illustrating a portion of a wireless communication network having a reconfigurable intelligent surface (RIS) disposed therein according to one or more aspects.

As described above, a poor or undesirable wireless communication channel may be present with respect to signals propagating between wireless communication devices (e.g., base station 105e and UE 115i, UE 115i and UE 115j, etc.), such as due to terrain topology, man-made structures, foliage and other live growth, etc. For example, wireless network portion 300 of FIG. 3, such as may comprise a portion of wireless network 100, includes obstacle 320 (e.g., comprising a building, a wall, a fence, dense foliage, etc.) disposed within the RF environment such that less than ideal signal propagation conditions are experienced with respect to wire-less communications between various ones of the devices. In the example of FIG. 3, although line of sight wireless communication is possible between base station 105e and UE 115i, line of sight wireless communication between base station 105e and UE 115j and between UE 115i and UE 115j is hindered by obstacle 320. For example, RF signals transmitted to or by UE 115j may be substantially attenuated or even blocked when passing through obstacle 320. Such an obstacle disposed in the direct path between communication devices can be particularly problematic with respect to certain RF signals, such as those in the mmWave band of frequencies. Obstacle 320 may thus cause poor or undesirable wireless communication channels between base station 105e and UE 115j and/or between UE 115i and UE 115j.

One or more RISs may be utilized for facilitating wireless links within wireless communication networks, such as where one or more obstacles may otherwise cause less than ideal signal propagation conditions. RISs deployed in wire-less network 100 according to aspects of the disclosure may, for example, provide configurable surfaces for controlling propagation of RF signals within the network, such as by controllably changing the reflective direction of RF signals impinging upon a RIS.

FIG. 3 shows an example in which RIS 310 is disposed within the network environment. RIS 310 may, for example, comprise one or more electromagnetic materials and electronic circuits whereby the electromagnetic materials are configurable under control of logic (e.g., software, firmware, etc.) implemented by the RIS to provide a configurable surface. A surface of one or more objects (e.g., buildings, walls, fences, signboards, road infrastructure, vehicles, etc.) within the environment of wireless network portion 300 may be coated with the electromagnetic material(s) of RIS 310 to provide the RIS. Additionally or alternatively, a purposebuilt support structure may be provided upon which the electromagnetic material(s) of RIS 310 are coated to provide the RIS. The electromagnetic material(s) of RIS 310 of some examples may include a large number of inexpensive antennas (e.g., microstrip patch antennas) whose inter-distance is of the order of half the wavelength of the RF signals for which the RIS is to be operable. As another example, the electromagnetic material(s) of RIS 310 may include metamaterial elements (e.g., sub-wavelength array formed by sub-wavelength metallic or dielectric scattering particles referred to as meta-atoms or unit-cells) whose size and inter-distance is much smaller than the wavelength of the RF signals for which the RIS is to be operable.

Irrespective of the particular electromagnetic materials or their underlying support configuration, RIS 310 is responsive to control signals provided thereto for reconfiguring aspects of the RIS and customizing the propagation of the RF signals impinging upon it. Accordingly, wireless network portion 300 of the example provides a smart radio environment in which the RF environment may be dynamically configured to assist the propagation of signals between the devices, rather than relying solely upon optimizing the devices themselves. For example, UE 115*i* may be enabled to directly communicate with UE 115*j* via a sidelink through appropriate control of RIS 310. In operation according to some examples, UE 115*i* may be enabled to directly communicate with UE 115*j* by controllably changing a state of RIS 310 in order to alter or change a reflection angle such that RF signals transmitted by UE 115*i* are reflected toward UE 115*j*. Similarly, although not shown in the example of FIG. 3, base station 105*e* may be enabled to directly communicate with UE 115*j* through appropriate control of RIS 310 by controllably changing the state of RIS 310 for reflecting RF signals transmitted by base station 105*e* toward UE 115*j*. Such control of RIS 310 essentially controls the wireless medium whereby the environment becomes part of the optimization space.

In some examples, a base station may provide control with respect RISs deployed within a service area of the of the base station. For example, base station 105*e* may operate to control RIS 310 for downlink and/or uplink communication with UEs (e.g., UEs 115*i* and 115*j*). In such an implementation, the presence of the RISs may be transparent to a UE, or the UE may not be able or allowed to directly control the RISs. Nevertheless, the base station may have the information for the RISs, such as the location of the RISs, the types of the RISs, the operating frequencies of the RISs, the control protocols (e.g., Type 1: Controllable RIS, wherein the RIS can receive a control signal from another node, the RIS may adjust the state based on the control signal, and the RIS may or may not have (at least limited) transmission capability), the patterns of state changes (e.g., Type 2: Non-controllable RIS, wherein the RIS changes its states based on a pre-configured pattern/schedule, such as periodic cycling of a set of states, and the pattern/schedule may or may not be known to (at least a subset of) nodes in the communication system), etc. In accordance with some examples, the base station may indicate the information about RIS(s) in the cell to UEs to facilitate communication via one or more RISs.

It may be desirable for a UE to directly control a RIS in some situations. In one example of such a situation, it may be desirable for a UE to directly control a RIS for discovery of the RIS by the UE. In this example, RIS information may be provided by a base station to the UE and the UE may try to detect or sense the RIS by transmitting RIS control messages and monitoring a reflected sensing signal. In another example situation, it may be desirable for a UE to directly control a RIS for peer-to-peer communication (e.g., sidelink). For example, range and robustness to blockage in sidelink communication may be improved if the sidelink transmitter node can properly control the RIS. In yet another example situation, it may be desirable for a UE to directly control a RIS for sensing and positioning. In this example, a RIS with known position may serve as a reference point for sensing and positioning (e.g., in addition to base stations) and a UE may control the RIS to enhance the range and accuracy of the sensing and positioning.

Although the example of FIG. 3 is shown with one instance of an RIS, there may be multiple RISs disposed within a wireless communication network, or portion thereof, according to aspects of the present disclosure. Moreover, in some examples, there may be multiple UEs eligible to use the RISs in the same cell. Accordingly, two or more UEs in the same cell may try to sense and/or control the same RIS at same time.

Multiple UEs transmitting sensing and/or control signals (e.g., overlapping in time and/or frequency) with respect to a same RIS may result in collisions, interference, and/or other undesired results. Even where the multiple UEs are each interacting with different RISs (e.g., multiple RISs in a same cell), undesired results may be experienced. For example, multiple sensing signals (e.g., transmitted by multiple UEs eligible to use RISs) reflected by a RIS and received at a UE may disrupt a RIS detection procedure implemented by the UE. Further, multiple control signals received by a RIS from UEs eligible to use the RIS may cause problems with respect to signal processing and/or control of the RIS.

Figure 4:
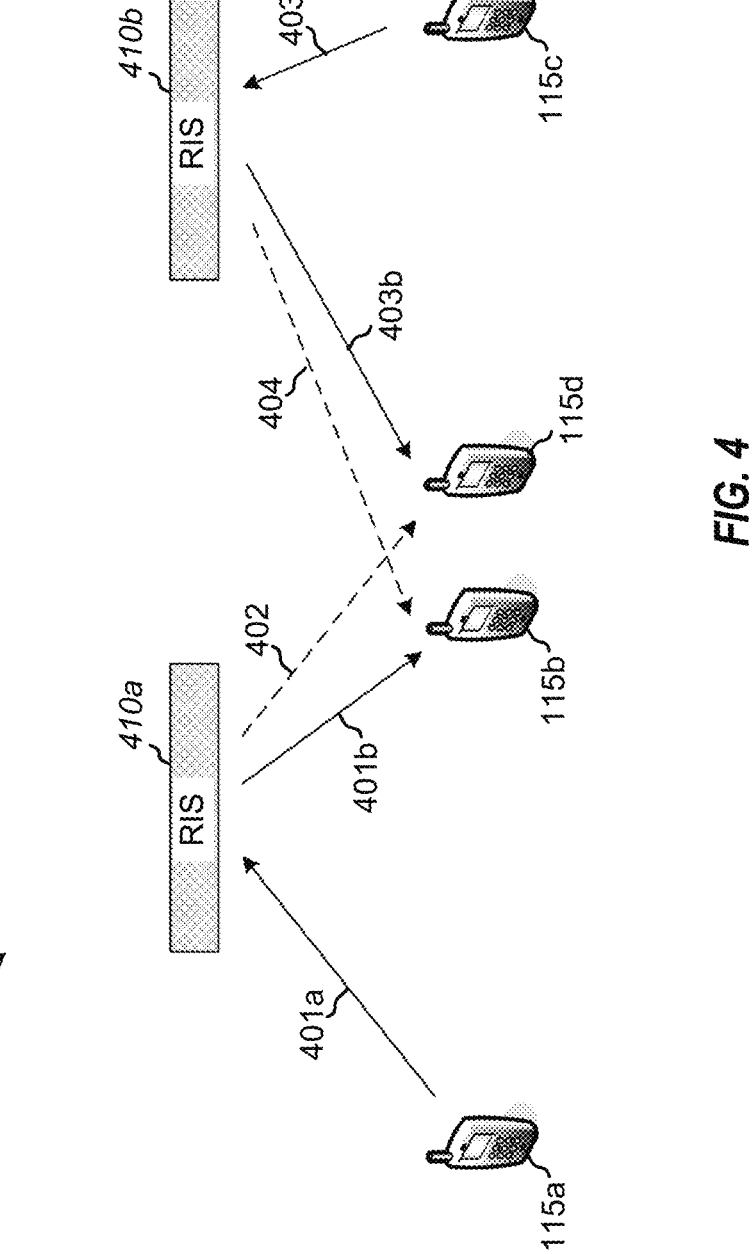
FIG. 4 is block diagram illustrating a portion of a wireless communication network having multiple RISs disposed therein according to one or more aspects.

FIG. 4 shows a situation in which multiple RISs are disposed within wireless network portion 400, such as may comprise a portion of wireless network 100. In particular, the illustrated example of wireless network portion 400 includes RISs 410*a* and 410*b*, each of which may comprise one or more electromagnetic materials and electronic circuits whereby the electromagnetic materials are configurable under control of logic (e.g., software, firmware, etc.) as described above with respect to RIS 310. Any or all of the foregoing issues with respect to multiple UEs transmitting sensing and/or control signals may be experienced in the environment of wireless network portion 400.

Moreover, in the example of FIG. 4, RISs 410*a* and 410*b* are controlled by different UEs. For example, RIS 410*a* may be controlled by UE 115*a* to provide a surface configuration for facilitating a sidelink with respect to UE 115*b* (e.g., via transmitted signal 401*a* and reflected signal 401*b*). Similarly, RIS 410*b* may be controlled by UE 115*c* to provide a surface configuration for facilitating a sidelink with respect to UE 115*d* (e.g., via transmitted signal 403*a* and reflected signal 403*b*). Interference may, however, be introduced with respect to one or more devices where the multiple RISs are controlled in an un-coordinated manner. For example, as shown in FIG. 4, although RIS 410*a* may be configured for optimizing a sidelink between UEs 115*a* and 115*b*, UE 115*d* disposed relatively near UE 115*b* may experience interference signal 402 associated with transmitted signal 401*a*. Likewise, RIS 410*b* may be independently configured for optimizing a sidelink between UEs 115*c* and 115*d*, and UE 115*b* disposed relatively near UE 115*d* may experience interference signal 404 associated with transmitted signal 403*a*.

It may be possible to resolve some of above mentioned issues associated with multiple RISs disposed within a wireless communication network and/or multiple UEs eligible to use the RISs in the same cell by statically assigning dedicated and orthogonal resources (e.g., time/frequency) for sensing and/or controlling the RISs and for communication using a RIS to different UEs. However, the use of such static resources for the RISs may be inefficient when the traffic load varies over time and across UEs. In accordance with some aspects of the present disclosure, dynamic scheduling of RIS resources (e.g., for control, sensing, and communication) may be implemented, such as for facilitating efficient resource utilization.

In operation according to an aspect of the disclosure, a RIS scheduling protocol may be implemented in which RIS scheduling with respect to wireless communication networks is provided. For example, network entities (e.g., any or all of base stations 105 of FIG. 1) may serve as central nodes to accommodate RIS sense and/or control requests from UEs (e.g., ones of UEs 115 operating within a service area of a respective base station) in communication therewith. RIS scheduling implemented according to aspects of the disclosure may facilitate coordinated control by a plurality of UEs with respect to multiple RISs deployed in a cell, a wireless communication network, etc. In operation according to some examples, the RIS scheduling protocol provides a technique for avoiding or otherwise mitigating potential collisions at the RISs, control conflicts at the RISs, interference introduced with respect to one or more devices within the wireless communication network, etc.

Figure 5:
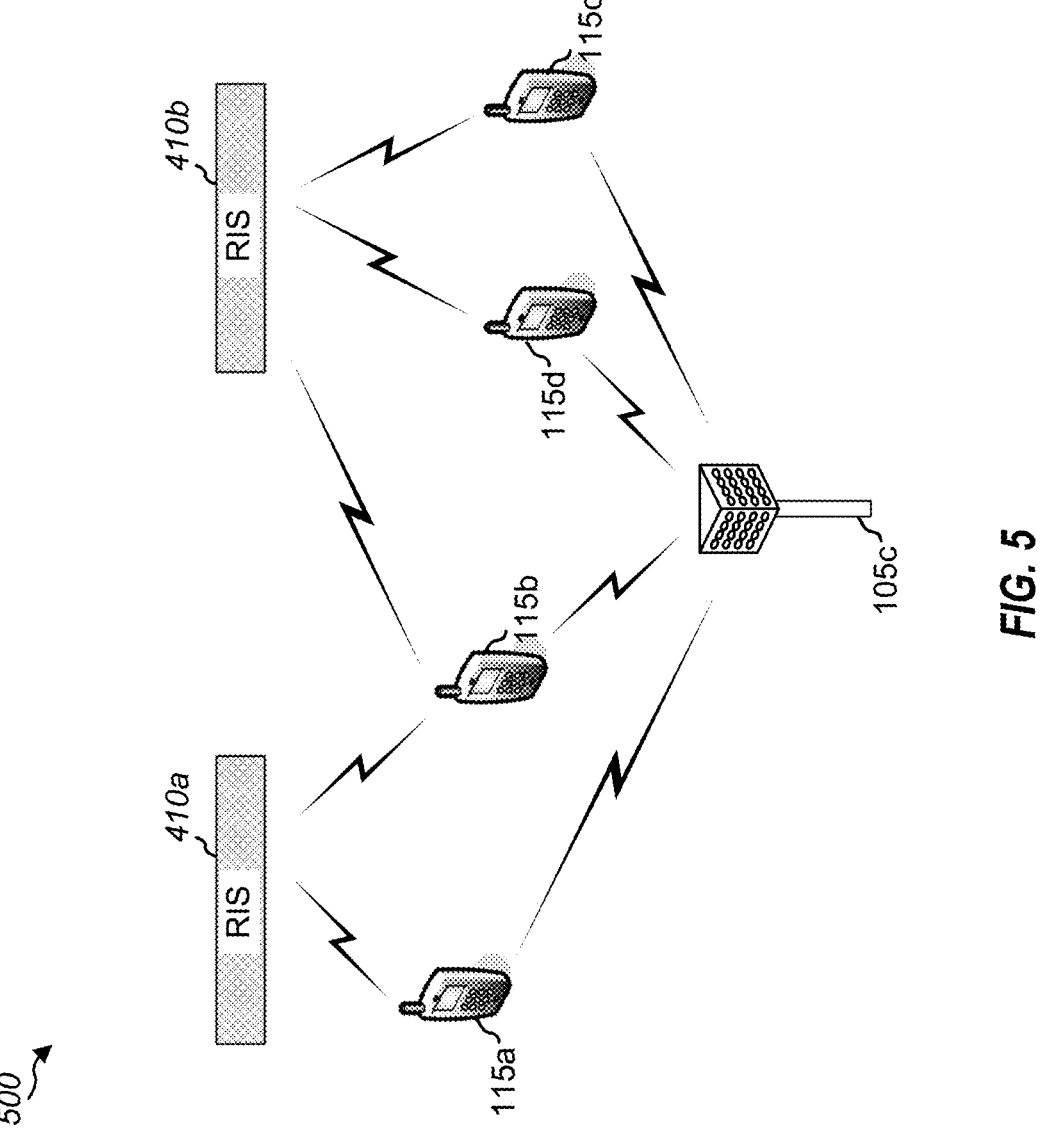
FIG. 5 is block diagram illustrating a portion of a wireless communication network operable to support RIS scheduling according to one or more aspects.

FIG. 5 shows wireless network portion 500, such as may comprise a portion of wireless network 100, configured for RIS scheduling according to some aspects of the present disclosure. Wireless network portion 500 of FIG. 5 corresponds to wireless network portion 400, discussed above with reference to FIG. 4, shown as further including a network node (shown as base station 105*c*) operable in cooperation with UEs (e.g., any or all of UEs 115*a*-115*d*) to implement a RIS scheduling protocol according to concepts of the present disclosure. Accordingly, wireless network portion 500 of the illustrated example includes base station 105*c*, UEs 115*a*-115*d*, and RISs 410*a* and 410*b*. It should be understood, however, that RIS scheduling may be provided with respect to different configurations than shown in FIG. 5, such as may comprise more or fewer base stations, more or fewer UEs, and/or more or fewer RISs.

In the example illustrated in FIG. 5, UEs 115*a*-115*d* are disposed in a service area or cell served by base station 105*c*. Depending upon the particular instance in time, the then current location of the particular UEs, the operational mode of the particular UEs, etc., base station 105*c* may be in communication with some or all of UEs 115*a*-115*d*.

In accordance with aspects of the disclosure, either or both of RISs 410*a* and 410*b* may be disposed within or outside of the service area of base station 105*c*. Irrespective of whether RIS 410*a* and/or RIS 410*b* are disposed within a service area of the base station, base station 105*c* may have the information for the RISs, such as the location of the RISs, the types of the RISs, the operating frequencies of the RISs, the control protocols, the patterns of state changes, etc. Although not expressly shown in FIG. 5 for simplifying the illustration, where one or more of RISs 410*a* and 410*b* is disposed within an area served by the base station, base station 105*c* may directly communication with the RIS(s) (e.g., for providing control on behalf of one or more UE). Additionally or alternatively, base station 105*c* may provide information to UEs for facilitating the UEs directly controlling one or more RISs.

Figure 7:
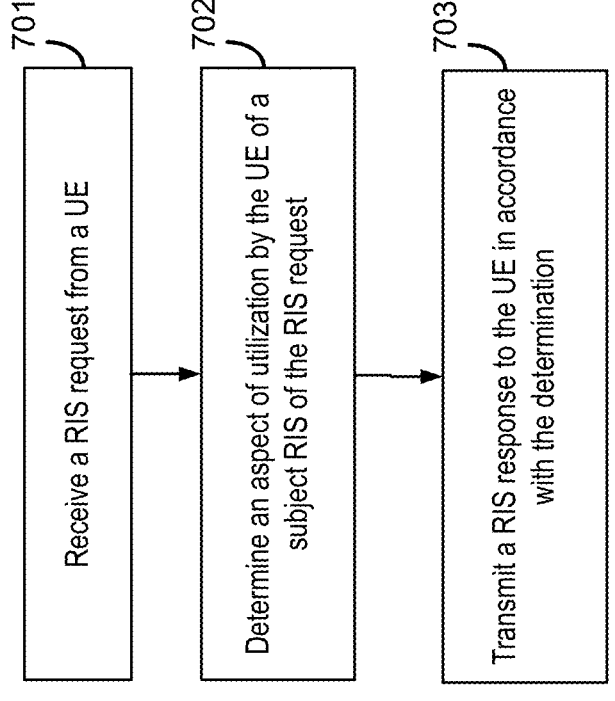
FIG. 7 is a flow diagram illustrating an example process, such as may be performed by network nodes, that supports RIS scheduling according to one or more aspects.
Figure 6:
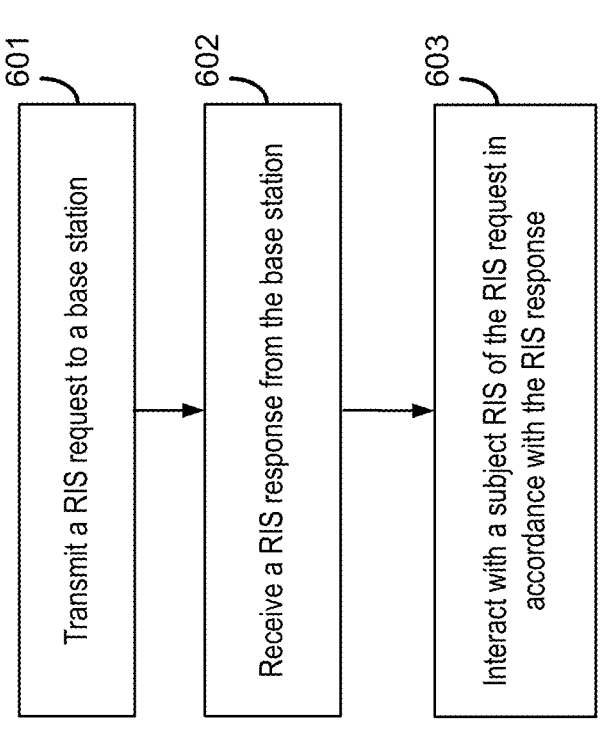
FIG. 6 is a flow diagram illustrating an example process, such as may be performed by user equipments (UEs), that supports RIS scheduling according to one or more aspects.

FIGS. 6 and 7 show flow diagrams providing operation for RIS scheduling according to aspects of the present disclosure. In particular, flow 600 of FIG. 6 provides an example process for operation by a UE implementing a RIS scheduling protocol in accordance with concepts herein. Correspondingly, flow 700 of FIG. 7 provides an example process for operation by a base station implementing a RIS scheduling protocol in accordance with concepts herein.

Referring first to FIG. 6, flow 600 illustrates an example process that supports RIS scheduling according to one or more aspects of the present disclosure. Operations of flow 600 may be performed by a UE, such as an instance of UE 115 described above with reference to FIGS. 1-5, and a UE as described with reference to FIG. 8 below. For example, operations (also referred to as "blocks") of flow 600 may be performed by and/or under control of logic of UE 115 (e.g., RIS scheduling logic implemented by controller 280 operating to execute logic or computer instructions stored in memory 282) to support one or more RIS scheduling protocols.

At block 601 of the example of flow 600, the UE transmits a RIS request to a base station. In accordance with some examples, when a UE wants to use and/or control a RIS (e.g., a particular RIS known to the UE), the UE may send a RIS request to a respective base station (e.g., a base station having a service area in which the RIS is disposed, a base station designated for control with respect to the RIS, etc.). For example, any of UEs 115*a*-115*d* of FIG. 5 having determined a need (e.g., for establishing peer-to-peer communication, for sensing and/or positioning, etc.) for utilizing either or both of RISs 410*a* and 410*b* may transmit (e.g., using transmit processor 264, TX MIMO processor 266, MODs 254*a*-254*r*, and antennas 252*a*-252*r* operating under control of controller 280) one or more RIS requests to base station 105*c*.

In accordance with some aspects, the UE may store information (e.g., within a RIS database) for use with respect to generating and/or transmitting RIS requests. Such information may, for example, include information regarding RISs deployed within the wireless communication network, base stations for providing control of respective RISs, etc. Information for the RISs and/or base stations providing RIS scheduling may, for example, be provided to the UE by one or more network node (e.g., by a base station when the UE connects to a wireless communication network, when the UE enters the service area of a base station having one or more RISs associated therewith, etc.). Additionally or alternatively, the information for the RISs and/or base stations providing RIS scheduling may be obtained or collected by the UE, through operation within the wireless communication network. In accordance with aspects of the disclosure, RIS scheduling logic implemented by controller 280 may utilize some or all of the foregoing information in determining a need for utilizing a RIS, for generating a RIS request with respect to a RIS, and/or for identifying a base station designated for control with respect to the RIS (e.g., a base station to which the RIS request is to be transmitted for RIS scheduling).

A RIS request transmitted according to some aspects of the disclosure may include one or more parameters useful with respect to scheduling. A RIS request may, for example, include information with respect to a subject RIS of the RIS request, information regarding the desired use of the RIS by the UE, etc. In some examples, the one or more parameters may include time resources (e.g., information identifying one or more time slots, subframes, frames, etc.), frequency resources (e.g., information identifying one or more subchannels, channels, etc.), or a combination thereof, such as may be preferred or otherwise requested for use (e.g., for communication, sensing and/or positioning, etc.) by the UE with respect to the RIS. Additionally or alternatively, the one or more parameters may include RIS identification (e.g., information identifying one or more subject RIS s), one or more RIS states (e.g., information identifying one or more phase shift, reflection angle, etc. states a RIS is capable of which are desired for use by the UE), RIS state pattern (e.g., information identifying one or more sequences of RIS states to be implemented by a RIS for the UE), or a combination thereof, such as may be preferred or otherwise requested for use (e.g., for communication, sensing and/or positioning, etc.) by the UE with respect to a RIS. The one or more parameters may additionally or alternatively include target UE identification (e.g., a UE for which a sidelink is to be established via a RIS), information regarding communication via or with the RIS (e.g., information identifying a type of communication link to be established via a RIS, such as sidelink, carrier aggregation, backhaul, etc., information indicating that the RIS is to be used for sensing, positioning, etc.), or a combination thereof.

A RIS request may be transmitted by the UE to a base station using a number of techniques. For example, a RIS request may be transmitted via uplink control information (UCI) (e.g., a RIS request, or some portion thereof, included in UCI carried in a PUCCH), a scheduling request (SR) (e.g., a RIS request, or some portion thereof, included in a media access control (MAC) SR), a MAC control element (CE) (e.g., a RIS request, or some portion thereof, included in a MAC CE transported in a PUSCH), radio resource control (RRC) (e.g., a RIS request, or some portion thereof, included in RRC signaling), or a combination thereof.

At block 602 of flow 600 in FIG. 6, the UE receives a RIS response from the base station. In accordance with some examples, a base station may reconcile multiple RIS requests from different UEs and schedule RIS resources accordingly. For example, base station 105*c* of FIG. 5 may be provided RIS requests from any or all of UEs 115*a*-115*d*, wherein the RIS requests may present conflicts with respect to use of one or more RIS (e.g., conflicts with respect to time resources, frequency resources, or a combination thereof where multiple UEs may need and/or request sensing and/or control of the same RIS with overlapped time and/or frequency resources). In accordance with some aspects, base station 105*c* may analyze the RIS requests, the underlying use of the RISs by the UEs, etc. and schedule RIS resources for the different UEs. For example, multiple RIS requests from different ones of UEs 115*a*-115*d* may be granted in a sequential (e.g., TDMA) manner so that only one pattern or control signal is effective at a particular RIS (e.g., a subject one of RISs 410*a* and 410*b*) at an instant in time. Such scheduling determinations may, for example, be decided based upon fairness considerations (e.g., first come, first granted). Any or all of UEs 115*a*-115*d* having transmitted a RIS request to base station 105*c* may thus receive (e.g., using antennas 252*a*-252*r*, DEMODs 254*a*-254*r*, MIMO detector 256, and receive processor 258 operating under control of controller 280) a RIS response from the base station providing information with respect to scheduling determinations made by the base station.

A RIS response received according to some aspects of the disclosure may include various information for facilitating use of, or otherwise interacting with, a RIS by the UE transmitting the RIS request. For example, a RIS response may include RIS identification (e.g., identifying an RIS for use by the UE), one or more allowed RIS states (e.g., operational states of the RIS permitted for use by the UE), one or more allowed RIS state patterns (e.g., RIS state sequences permitted for use by the UE), etc.

A base station may control a subject RIS (e.g., a RIS which is subject of a RIS request and/or a RIS response) on behalf of a UE according to some aspects of the disclosure. In operation according to some examples in which the base station provides control of a subject RIS on behalf of a UE, the RIS response may include information regarding scheduling determinations for the subject RIS (e.g., informing the UE of the RIS resources granted for use by the UE). According to further aspects of the disclosure, a UE may control a subject RIS. In operation according to some examples in which the UE provides control of a subject RIS, the RIS response may include information facilitating control of the RIS by the UE (e.g., informing the UE of resources granted for RIS control message transmission and RIS resources granted for use by the UE).

According to some aspects of the disclosure, a RIS response may include scheduling information regarding one or more scheduled resources with respect to a subject RIS. In some examples, the scheduling information may include information (e.g., information including one or more time slots, subframes, frames, etc. scheduled with respect to the UE) facilitating TDMA of the subject RIS by the UE transmitting the RIS request and one or more additional UEs also having transmitted a RIS request to the base station. Additionally or alternatively, the scheduling information may include information (e.g., information including one or more time slots, subframes, frames, etc. and/or one or more subchannels, channels, etc. scheduled with respect to the UE) facilitating coordinated utilization of the subject RIS by the UE and utilization of at least one additional RIS by a UE of one or more additional UEs also having transmitted a RIS request to the base station. Scheduling information included in a RIS response according to some aspects may additionally or alternatively include one or more scheduling grants for RIS resources. For example, where the base station controls the subject RIS on behalf of the UE, the scheduling information may include information informing the UE of RIS resources granted for use of the RIS by the UE. Where the UE directly controls the subject RIS, the scheduling information may include information informing the UE of resources granted for use in controlling the RIS by the UE and RIS resources granted for use of the RIS by the UE.

RIS responses and/or information provided thereby may be stored by a UE. For example, UEs may store various information for facilitating use of or otherwise interacting with a RIS, such as within a RIS database. In accordance with some aspects of the disclosure, a UE may use a RIS database to store RIS identification, one or more allowed RIS states, one or more allowed RIS state patterns, scheduling information with respect to a subject RIS, etc.

In operation according to some aspects, use of a RIS may not always be granted in response to a RIS request transmitted by a UE. For example, there may be situations in which it is not possible to resolve some conflicting issues with respect to one or more RISs and their use by multiple UEs. Accordingly, a RIS response of some examples may include an indication of rejection of the RIS request. For example, a base station may provide RIS responses to each UE having transmitted a RIS request, wherein the RIS responses may include acceptance or rejection of the corresponding RIS request. Where the RIS response includes an acceptance, the RIS response may include some or all of the information described above. Where the RIS response includes a rejection, the RIS response may include information (e.g., information regarding a backoff window or timeframe for availability of a subject RIS of a RIS request, information regarding an alternative RIS that may be suitable and/or available for use by the UE, etc.) for facilitating use or interaction of a RIS by the UE.

A RIS response may be received by the UE from a base station using a number of techniques. For example, a RIS request may be received via downlink DCI (e.g., a RIS response, or some portion thereof, included in DCI carried in a PDCCH), a MAC CE (e.g., a RIS response, or some portion thereof, included in a MAC CE transported in a PDSCH), RRC (e.g., a RIS response, or some portion thereof, included in RRC signaling), or a combination thereof.

At block 603 of the example of flow 600 shown in FIG. 6, the UE interacts with a subject RIS of the RIS request in accordance with the RIS response. For example, one of UEs 115a-115d having received a RIS response from base station 105c may operate under control of RIS scheduling logic implemented by controller 280 to transmit, or refrain from transmitting, one or more signals (e.g., control signals, sensing signals, positioning signals, communication signals, etc.) directed toward a subject RIS (e.g., one or more of RISs 410a and 410b) consistent with parameters provided in the RIS response (e.g., as may be stored in a RIS database). In a case in which a base station controls a subject RIS on behalf of the UE, the UE may utilize some or all of the RIS resources granted for use by the UE in the RIS response for transmitting a sensing signal directed to the RIS (e.g., for obtaining sensing information with respect to the RIS), transmitting a positioning signal directed to the RIS (e.g., for use in determining a position of the UE), and/or transmitting a communication signal directed to the RIS (e.g., for sidelink communication with another UE). In a case in which a UE controls a subject RIS, the UE may utilize some or all of the RIS resources granted for use by the UE in in the RIS response for transmitting a control signal directed to the RIS (e.g., for configuring the RIS for use by the UE). The UE controlling the subject RIS may further utilize some or all of the RIS resources granted for use by the UE for transmitting a sensing signal directed to the RIS (e.g., for obtaining sensing information with respect to the RIS), transmitting a positioning signal directed to the RIS (e.g., for use in determining a position of the UE), and/or transmitting a communication signal directed to the RIS (e.g., for sidelink communication with another UE). In a case in which a RIS request is rejected, interaction with a subject RIS by the UE according to some examples may comprise action undertaken by the UE in accordance with the rejection of the RIS response (e.g., deferring transmitting one or more signals directed to the subject RIS by the UE until such time as a RIS request is accepted, transmitting one or more signals directed to an alternative RIS, transmitting a subsequent RIS request, etc.).

Referring now to FIG. 7, flow 700 illustrates an example process that supports RIS scheduling according to one or more aspects of the present disclosure. Operations of flow 700 may be performed by a base station or other network node, such as an instance of base station 105 described above with reference to FIGS. 1-5, and a base station as described with reference to FIG. 9 below. For example, operations (also referred to as "blocks") of flow 700 may be performed by and/or under control of logic of base station 105 (e.g., RIS scheduling logic implemented by controller 240 operating to execute logic or computer instructions stored in memory 242) to support one or more RIS scheduling protocols.

At block 701 of the example of flow 700, the base station receives a RIS request from a UE. In accordance with some examples, when a UE wants to use and/or control a RIS (e.g., a particular RIS known to the UE), the UE may provide a RIS request which may be received by a respective base station (e.g., a base station having a service area in which the RIS is disposed, a base station designated for control with respect to the RIS, etc.). For example, base station 105c of FIG. 5 may receive (e.g., using antennas 234a-234t, DEMODs 232a-232t, MIMO detector 236, and receive processor 238 operating under control of controller 240) one or more RIS requests to from any or all of UEs 115a-115d. The one or more RIS requests may, for example, be received by the base station in association with the UE(s) having determined a need for utilizing and/or controlling one or more RISs disposed within a service area of the base station.

A RIS request received according to some aspects of the disclosure may include one or more parameters useful with respect to scheduling. A RIS request may, for example, include information with respect to a subject RIS of the RIS request, information regarding the desired use of the RIS by a UE, etc. In some examples, the one or more parameters may include time resources (e.g., information identifying one or more time slots, subframes, frames, etc.), frequency resources (e.g., information identifying one or more subchannels, channels, etc.), or a combination thereof, such as may be preferred otherwise requested for use (e.g., for communication, sensing and/or positioning, etc.) by a UE with respect to the RIS. Additionally or alternatively, the one or more parameters may include RIS identification (e.g., information identifying one or more subject RISs), one or more RIS states (e.g., information identifying one or more phase shift, reflection angle, etc. states a RIS is capable of which are desired for use by the UE), RIS state pattern (e.g., information identifying one or more sequences of RIS states to be implemented by a RIS for the UE), or a combination thereof, such as may be preferred or otherwise requested for use (e.g., for communication, sensing and/or positioning, etc.) by a UE with respect to a RIS. The one or more parameters may additionally or alternatively include target UE identification (e.g., a UE for which a sidelink is to be established via a RIS), information regarding communication via or with the RIS (e.g., information identifying a type of communication link to be established via a RIS, such as sidelink, carrier aggregation, backhaul, etc., information indicating that the RIS is to be used for sensing, positioning, etc.), or a combination thereof.

RIS requests and/or information provided thereby may be stored by a base station. For example, base stations may store various information for determining aspects of utilization of RISs by one or more UEs, such as to determine scheduling grants for RIS resources with respect to a particular RIS (e.g., a subject one of RISs 410a and 410b). In accordance with some aspects of the disclosure, a base station may use a RIS database to store RIS requests, information provided thereby, information regarding scheduling grants, etc.

A RIS request may be received from a UE by the base station using a number of techniques. For example, a RIS request may be received via uplink control information (UCI) (e.g., a RIS request, or some portion thereof, included in UCI carried in a PUCCH), a SR (e.g., a RIS request, or some portion thereof, included in a MAC SR), a MAC CE (e.g., a RIS request, or some portion thereof, included in a MAC CE transported in a PUSCH), RRC (e.g., a RIS request, or some portion thereof, included in RRC signaling), or a combination thereof.

At block 702 of flow 700 in FIG. 7, the base station determines an aspect of utilization by the UE of a subject RIS (e.g., a RIS which is subject of a RIS request and/or a RIS response). For example, base station 105c of FIG. 5 may analyze (e.g., through operation of RIS scheduling logic implemented by controller 240) one or more parameters included in or associated with the received RIS request to determine a scheduling grant for RIS resources with respect to a particular RIS (e.g., a subject one of RISs 410a and 410b). In accordance with some aspects of the disclosure, the base station may receive multiple RIS requests (e.g., simultaneous RIS requests or RIS requests for overlapping use of one or more RISs, such as may present conflicts with respect to time resources, frequency resources, or a combination thereof) from different UEs. Accordingly, analysis to determine a scheduling grant with respect to RIS resources for a particular UE may take into consideration one or more RIS requests of such multiple RIS requests (e.g., analyzing parameters included in or associated with the additional RIS requests along with parameters included in or associated with the first mentioned received RIS request). The analysis may reconcile the requests (e.g., considering fairness among UEs), and schedule RIS resources for different UEs. Upon several UEs requesting use of the same RIS with overlapping time and/or frequency resources, resource allocation between UEs may be provided which reflect fairness (e.g., first come first granted). For example, multiple RIS requests from different UEs may be granted in a sequential or TDMA manner so that only one RIS state, RIS state pattern, control signal, etc. is effective with respect to a particular RIS at any instance in time. Additionally or alternatively, a scheduling grant determined by a base station may provide for coordinated utilization of the subject RIS by the UE and utilization of at least one additional RIS by a UE of one or more additional UEs also having transmitted a RIS request to the base station.

At block 703 of the example of flow 700 shown in FIG. 7, the base station transmits a RIS response from the UE in accordance with the determination. The RIS response may, for example, comprise scheduling information regarding one or more scheduled resources with respect to the subject RIS, wherein one or more of the scheduled resources are determined from an analysis of one or more parameters included in or associated with the received RIS request. In accordance with some examples, the base station having reconciled multiple RIS requests from different UEs may transmit (e.g., using transmit processor 220, TX MIMO processor 230, MODs 232a-232t, and antennas 234a-234t operating under control of controller 240) a RIS response in accordance with its analysis of parameters included in or associated with the received RIS request of the first mentioned UE and included in or associated with the RIS requests of the different UEs.

A RIS response transmitted according to some aspects of the disclosure may include various information for facilitating use of, or otherwise interacting with, a RIS by a UE. For example, a RIS response may include RIS identification (e.g., identifying an RIS for use by the UE), one or more allowed RIS states (e.g., operational states of the RIS permitted for use by the UE), one or more allowed RIS state patterns (e.g., RIS state sequences permitted for use by the UE), etc.

The base station may control a subject RIS (e.g., a RIS which is subject of a RIS request and/or a RIS response) on behalf of a UE according to some aspects of the disclosure. In operation according to some examples in which the base station provides control of a subject RIS on behalf of a UE, the RIS response may include information regarding scheduling determinations for the subject RIS (e.g., informing the UE of the RIS resources granted for use by the UE). The base station may control a subject RIS on behalf of the UE in accordance with scheduling information provided in a RIS response informing the UE of granted RIS resources. According to further aspects of the disclosure, a UE may control a subject RIS. In operation according to some examples in which the UE provides control of a subject RIS, the RIS response may include information facilitating control of the RIS by the UE (e.g., informing the UE of resources granted for RIS control message transmission and RIS resources granted for use by the UE).

According to some aspects of the disclosure, a RIS response may include scheduling information regarding one or more scheduled resources with respect to a subject RIS. In some examples, the scheduling information may include information (e.g., information including one or more time slots, subframes, frames, etc. scheduled with respect to the UE) facilitating TDMA of the subject RIS by the UE transmitting the RIS request and one or more additional UEs also having transmitted a RIS request to the base station. Additionally or alternatively, the scheduling information may include information (e.g., information including one or more time slots, subframes, frames, etc. and/or one or more subchannels, channels, etc. scheduled with respect to the UE) facilitating coordinated utilization of the subject RIS by the UE and utilization of at least one additional RIS by a UE of one or more additional UEs also having transmitted a RIS request to the base station. Scheduling information included in a RIS response according to some aspects may additionally or alternatively include one or more scheduling grants for RIS resources. For example, where the base station controls the subject RIS on behalf of the UE, the scheduling information may include information informing the UE of RIS resources granted for use of the RIS by the UE. Where the UE directly controls the subject RIS, the scheduling information may include information informing the UE of resources granted for use in controlling the RIS by the UE and RIS resources granted for use of the RIS by the UE.

In operation according to some aspects, use of a RIS may not always be granted by a base station in response to a RIS request. For example, there may be situations in which it is not possible to resolve some conflicting issues with respect to one or more RISs and their use by multiple UEs. Accordingly, a RIS response of some examples may include an indication of rejection of the RIS request. For example, RIS responses may be transmitted to each UE from which a RIS request is received, wherein the RIS responses may include acceptance or rejection of the corresponding RIS request. Where the RIS response includes an acceptance, the RIS response may include some or all of the information described above. Where the RIS response includes a rejection, the RIS response may include information (e.g., information regarding a backoff window or timeframe for availability of a subject RIS of a RIS request, information regarding an alternative RIS that may be suitable and/or available for use by the UE, etc.) for facilitating use or interaction of a RIS by the UE.

A RIS response may be transmitted to a UE by the base station using a number of techniques. For example, a RIS request may be transmitted via downlink DCI (e.g., a RIS response, or some portion thereof, included in DCI carried in a PDCCH), a MAC CE (e.g., a RIS response, or some portion thereof, included in a MAC CE transported in a PDSCH), RRC (e.g., a RIS response, or some portion thereof, included in RRC signaling), or a combination thereof.

Figure 8:
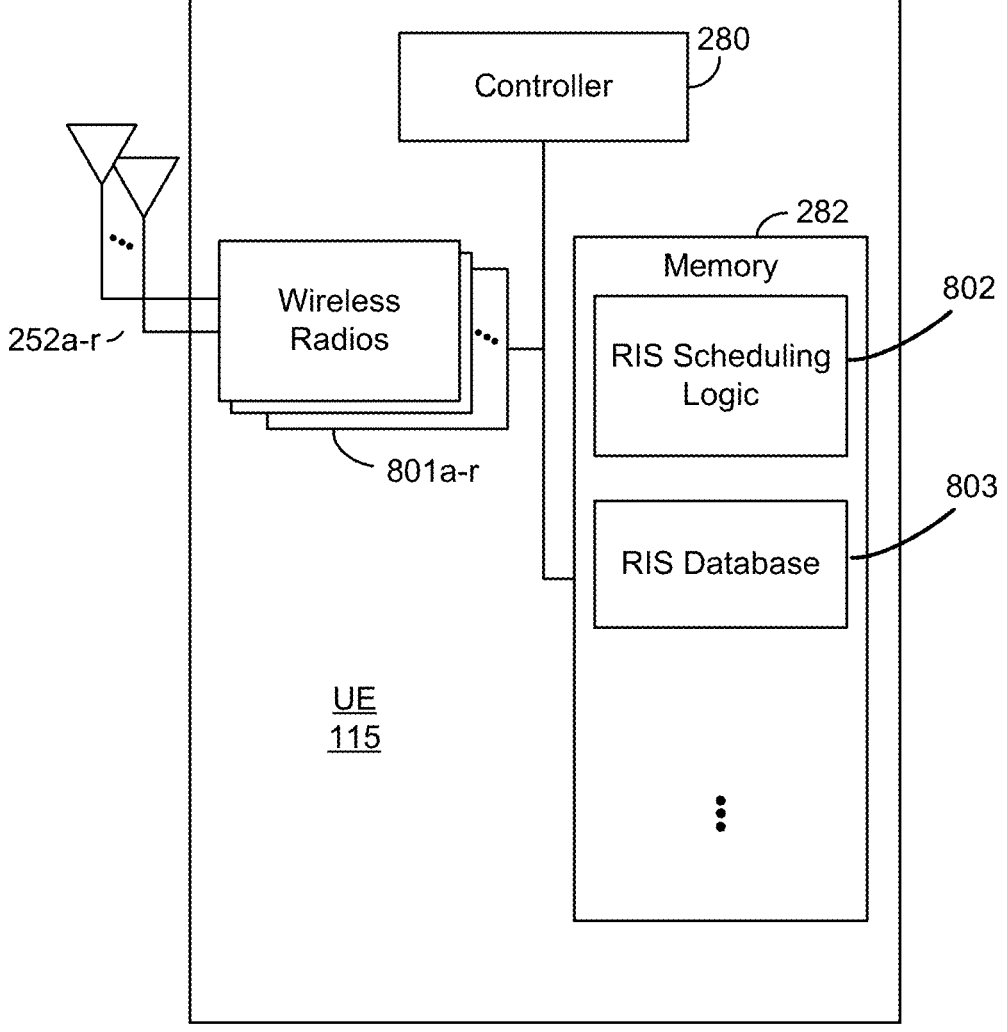
FIG. 8 is a block diagram of an example UE that supports RIS scheduling according to one or more aspects.
Figure 9:
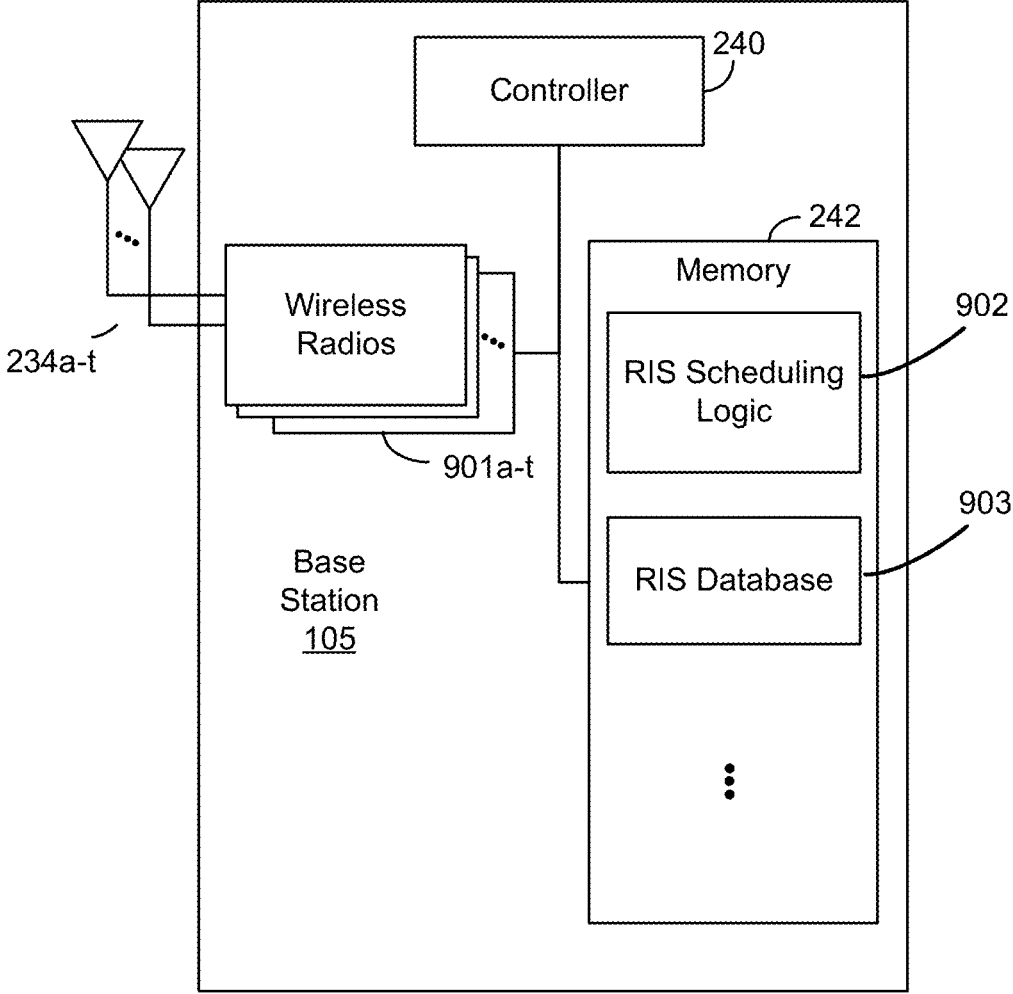
FIG. 9 is a block diagram of an example base station that supports RIS scheduling according to one or more aspects.

FIGS. 8 and 9 show block diagrams of an example UE and base station configured for RIS scheduling according to aspects of the present disclosure. In particular, FIG. 8 shows an example of UE 115 configured for operation implementing a RIS scheduling protocol in accordance with concepts herein. Correspondingly, FIG. 9 shows an example of base station 105 configured for operation implementing a RIS scheduling protocol in accordance with concepts herein.

FIG. 8 is a block diagram of an example of UE 115 that supports RIS scheduling according to aspects of the present disclosure. UE 115 of the illustrated example is configured to perform operations, including the blocks of flow 600 described with reference to FIG. 6. In some implementations, UE 115 includes the structure, hardware, and components shown and described with reference to UE 115 of FIGS. 1 and 2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 801a-r and antennas 252a-r. Wireless radios 801a-r include various components and hardware, as illustrated in FIG. 2 for UE 115, including MODs and DEMODs 254a-r, MIMO detector 256, receive processor 258, transmit processor 264, and TX MIMO processor 266.

As shown, memory 282 may include RIS scheduling logic 802 and RIS database 803. RIS scheduling logic 802 may comprise computer instructions which when implemented by controller 280 operate to perform and/or control functions (e.g., one or more operations of flow 600 described with reference to FIG. 6) supporting one or more RIS scheduling protocols. RIS database 803 may store various information useful to UE 115 in generating RIS requests, controlling and/or using RISs, etc. in accordance with a RIS scheduling protocol.

FIG. 9 is a block diagram of an example of base station 105 that supports RIS scheduling according to aspects of the present disclosure. Base station 105 of the illustrated example is configured to perform operations, including the blocks of flow 700 described with reference to FIG. 7. In some implementations, base station 105 includes the structure, hardware, and components shown and described with reference to base station 105 of FIGS. 1 and 2. For example, base station 105 includes controller 240, which operates to execute logic or computer instructions stored in memory 242, as well as controlling the components of base station 105 that provide the features and functionality of base station 105. Base station 105, under control of controller 240, transmits and receives signals via wireless radios 901a-t and antennas 234a-t. Wireless radios 901a-t include various components and hardware, as illustrated in FIG. 2 for base station 105, including MODs and DEMODs 232a-t, transmit processor 220, TX MIMO processor 230, MIMO detector 236, and receive processor 238.

As shown, memory 242 may include RIS scheduling logic 902 and RIS database 903. RIS scheduling logic 902 may comprise computer instructions which when implemented by controller 240 operate to perform and/or control functions (e.g., one or more operations of flow 700 described with reference to FIG. 7) supporting one or more RIS scheduling protocols. RIS database 903 may store various information useful to base station 105 in reconciling RIS requests, granting RIS resources, generating RIS responses, controlling and/or using RISs, etc. in accordance with a RIS scheduling protocol.

It is noted that one or more blocks (or operations) described with reference to FIGS. 6 and 7 may be combined with one or more blocks (or operations) described with reference to another of the figures. For example, one or more blocks (or operations) of FIG. 2 may be combined with one or more blocks (or operations) of FIG. 6 and/or FIG. 7. Additionally, or alternatively, one or more operations described above with reference to FIGS. 1-5 may be combined with one or more operations described with reference to FIGS. 8 and/or 9.

Non-limiting examples have been described above with respect to network nodes, such as base stations, operating to accommodate RIS requests from UEs with respect to one or more RISs. Various other wireless communication devices (e.g., UEs) may be configured to provide control, management, coordination, etc. for RIS scheduling according to some aspects of the disclosure.

Aspects of the disclosure have been described above with reference to RISs utilized with respect to a wireless communication network. Concepts of the present disclosure may, however, be implemented with respect to various controlled relay devices (e.g., base station controlled and/or UE controlled relay devices).

In some examples of methods, apparatuses, and articles described herein, various aspects of RIS scheduling may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for transmitting a RIS request to a base station, receiving a RIS response from the base station, and interacting with a subject RIS of the RIS request in accordance with the RIS response.

2. The methods, apparatuses, and articles of clause 1, wherein the RIS request is transmitted to the base station in response to the UE determining a need for utilizing a RIS disposed within a service area of the base station.

3. The methods, apparatuses, and articles of any of clauses 1 and 2, wherein the RIS request is transmitted to the base station in response to the UE determining a need for controlling a RIS disposed within a service area of the base station.

4. The methods, apparatuses, and articles of any of clauses 1-3, wherein the RIS request includes one or more parameters with respect to the subject RIS of the RIS request.

5. The methods, apparatuses, and articles of clause 4, wherein the one or more parameters include at least one parameter selected from the group consisting of time resources and frequency resources requested for use by the UE with respect to the subject RIS.

6. The methods, apparatuses, and articles of any of clauses 4 and 5, wherein the one or more parameters include at least one parameter selected from the group consisting of RIS identification, one or more RIS states, and RIS state pattern requested for use by the UE with respect to the subject RIS.

7. The methods, apparatuses, and articles of any of clauses 4-6, wherein the one or more parameters include at least one parameter selected from the group consisting of target UE identification and information regarding communication via the subject RIS.

8. The methods, apparatuses, and articles of any of clauses 4-7, wherein the RIS request is transmitted to the base station via UCI, a SR, a MAC CE, RRC, or a combination thereof.

9. The methods, apparatuses, and articles of any of clauses 1-8, wherein the RIS response comprises scheduling information regarding one or more scheduled resources with respect to the subject RIS of the RIS request.

10. The methods, apparatuses, and articles of clause 9, wherein the scheduling information provides for TDMA of the subject RIS by the UE and one or more additional UEs also having transmitted a RIS request to the base station.

11. The methods, apparatuses, and articles of any of clauses 9 and 10, wherein the scheduling information provides for coordinated utilization of the subject RIS by the UE and utilization of at least one additional RIS by a UE of one or more additional UEs also having transmitted a RIS request to the base station.

12. The methods, apparatuses, and articles of any of clauses 9-11, wherein the scheduling information comprises one or more scheduling grants for RIS resources.

13. The methods, apparatuses, and articles of any of clauses 9-12, wherein the base station controls the subject RIS on behalf of the UE in accordance with the scheduling information and the scheduling information informs the UE of granted RIS resources.

14. The methods, apparatuses, and articles of any of clauses 9-12, wherein the scheduling information informs the UE of granted RIS resources and the UE controls the subject RIS in accordance with the scheduling information.

15. The methods, apparatuses, and articles of any of clauses 1-14, wherein the RIS response includes an indication of acceptance or rejection of the RIS request made by the UE.

16. The methods, apparatuses, and articles of any of clauses 1-15, wherein the RIS response includes one or more parameters with respect to the subject RIS of the RIS request.

17. The methods, apparatuses, and articles of clause 16, wherein the one or more parameters include at least one parameter selected from the group consisting of granted RIS identification and one or more allowed RIS states.

18. The methods, apparatuses, and articles of any of clauses 1-17, wherein the RIS response is received from the base station via DCI, a MAC CE, RRC, or a combination thereof.

19. Methods, apparatuses, and articles for wireless communication may provide for receiving a RIS request from a UE, determining an aspect of utilization by the UE of a subject RIS of the RIS request, and transmitting a RIS response to the UE in accordance with the determination.

20. The methods, apparatuses, and articles of clause 19, wherein the RIS request is received by the base station in association with the UE having determined a need for utilizing a RIS disposed within a service area of the base station.

21. The methods, apparatuses, and articles of any of clauses 19 and 20, wherein the RIS request is received by the base station in association with the UE having determined a need for controlling a RIS disposed within a service area of the base station.

22. The methods, apparatuses, and articles of any of clauses 19-21, wherein the RIS request includes one or more parameters with respect to the subject RIS.

23. The methods, apparatuses, and articles of clause 22, wherein the one or more parameters include at least one parameter selected from the group consisting of time resources and frequency resources requested for use by the UE with respect to the subject RIS.

24. The methods, apparatuses, and articles of any of clauses 22 and 23, wherein the one or more parameters include at least one parameter selected from the group consisting of RIS identification, one or more RIS states, and RIS state pattern requested for use by the UE with respect to the subject RIS.

25. The methods, apparatuses, and articles of an of clauses 22-24, wherein the one or more parameters include at least one parameter selected from the group consisting of target UE identification and information regarding communication via the subject RIS.

26. The methods, apparatuses, and articles of any of clauses 22-25, wherein the RIS request is received from the UE via UCI, a SR, a MAC CE, RRC, or a combination thereof.

27. The methods, apparatuses, and articles of any of clauses 19-26, further comprising determining a scheduling grant for RIS resources with respect to the subject RIS.

28. The methods, apparatuses, and articles of any of clauses 19-27, further comprising receiving one or more RIS requests from one or more additional UEs, wherein the RIS request received from the UE and the one or more RIS requests received from the one or more additional UEs present conflicts with respect to time resources, frequency resources, or a combination thereof.

29. The methods, apparatuses, and articles of clause 28, wherein the determining the scheduling grant for the RIS resources comprises reconciling the RIS request received from the UE and the one or more RIS requests received from the one or more additional UEs.

30. The methods, apparatuses, and articles of any of clauses 28 and 29, wherein the determining the scheduling grant for the RIS resources is based at least in part on fairness considerations with respect to the UE and the one or more additional UEs.

31. The methods, apparatuses, and articles of clause 30, wherein the fairness considerations apply a first requested first granted policy.

32. The methods, apparatuses, and articles of any of clauses 19-31, wherein the RIS response comprises scheduling information regarding one or more scheduled resources with respect to the subject RIS.

33. The methods, apparatuses, and articles of clause 32, wherein the scheduling information provides for TDMA of the subject RIS by the UE and one or more additional UEs also having transmitted a RIS request to the base station.

34. The methods, apparatuses, and articles of any of clauses 32 and 33, wherein the scheduling information provides for coordinated utilization of the subject RIS by the UE and utilization of at least one additional RIS by a UE of one or more additional UEs also having transmitted a RIS request to the base station.

35. The methods, apparatuses, and articles of any of clauses 32-34, wherein the scheduling information comprises one or more scheduling grants for RIS resources.

36. The methods, apparatuses, and articles of any of clauses 32-35, further comprising controlling the subject RIS on behalf of the UE in accordance with the scheduling information, wherein the scheduling information informs the UE of granted RIS resources.

37. The methods, apparatuses, and articles of any of clauses 32-35, wherein the scheduling information informs the UE of granted RIS resources and the UE controls the subject RIS in accordance with the scheduling information.

38. The methods, apparatuses, and articles of any of clauses 19-37, wherein the determined aspect of utilization by the UE of the subject RIS comprises acceptance or rejection of the RIS request for utilization of the subject RIS, and wherein the RIS response includes an indication of acceptance or rejection of the RIS request.

39. The methods, apparatuses, and articles of any of clauses 19-37, wherein the RIS response includes one or more parameters with respect to the subject RIS.

40. The methods, apparatuses, and articles of clause 39, wherein the one or more parameters include at least one parameter selected from the group consisting of granted RIS identification and one or more allowed RIS states.

41. The methods, apparatuses, and articles of any of clauses 19-40, wherein the RIS response is transmitted to the UE via DCI, a MAC CE, RRC, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination;

A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

transmitting a reconfigurable intelligent surface (RIS) request to a base station requesting use, control, or use and control of a subject RIS known to the UE facilitating communication between the UE and a target UE via the subject RIS, wherein the RIS request includes information regarding the subject RIS of the RIS request;

receiving a RIS response from the base station including an acceptance or rejection of the RIS request, wherein the RIS response comprises:

scheduling information regarding one or more scheduled resources with respect to the subject RIS of the RIS request, or scheduling information regarding one or more scheduled resources granted for use by the UE with respect to the subject RIS of the RIS request; and interacting with the subject RIS of the RIS request in accordance with the RIS response.

2. The method of claim 1, wherein the RIS request includes one or more parameters with respect to the subject RIS of the RIS request, and wherein the one or more parameters include at least one parameter selected from the group consisting of time resources and frequency resources requested for use by the UE with respect to the subject RIS.

3. The method of claim 1, wherein the RIS request includes one or more parameters with respect to the subject RIS of the RIS request, and wherein the one or more parameters include at least one parameter selected from the group consisting of RIS identification, one or more RIS states, and RIS state pattern requested for use by the UE with respect to the subject RIS.

4. The method of claim 1, wherein the RIS request includes one or more parameters with respect to the subject RIS of the RIS request, and wherein the one or more parameters include at least one parameter selected from the group consisting of target UE identification and information regarding communication via the subject RIS.

5. The method of claim 1, wherein the scheduling information provides for time division multiple access (TDMA)

of the subject RIS by the UE and one or more additional UEs also having transmitted a RIS request to the base station.

6. The method of claim 1, wherein the scheduling information provides for coordinated utilization of the subject RIS by the UE and utilization of at least one additional RIS by a UE of one or more additional UEs also having transmitted a RIS request to the base station.

7. The method of claim 1, wherein the scheduling information comprises one or more scheduling grants for RIS resources facilitating communication between the UE and the target UE via the subject RIS.

8. The method of claim 1, wherein the base station is configured to control the subject RIS on behalf of the UE in accordance with the scheduling information and the scheduling information informs the UE of granted RIS resources.

9. The method of claim 1, wherein the scheduling information informs the UE of granted RIS resources and the UE controls the subject RIS in accordance with the scheduling information.

10. The method of claim 1, wherein the RIS response includes one or more parameters with respect to the subject RIS of the RIS request, and wherein the one or more parameters include at least one parameter selected from the group consisting of granted RIS identification and one or more allowed RIS states.

11. A user equipment (UE) configured for wireless communication, the UE comprising:

a processing system that includes at least one processor and memory coupled with the at least one processor, the processing system configured to cause the UE to:

transmit a reconfigurable intelligent surface (RIS) request to a base station requesting use, control, or use and control of a subject RIS known to the UE facilitating communication between the UE and a target UE via the subject RIS, wherein the RIS request includes information regarding the subject RIS of the RIS request;

receive a RIS response from the base station including an acceptance or rejection of the RIS request, wherein the RIS response comprises scheduling information regarding one or more scheduled resources with respect to the subject RIS of the RIS request; and interact with the subject RIS of the RIS request in accordance with the RIS response.

12. The UE of claim 11, wherein the RIS request includes one or more parameters with respect to the subject RIS of the RIS request, and wherein the one or more parameters include a parameter selected from the group consisting of time resources and frequency resources requested for use by the UE with respect to the subject RIS, a first parameter selected from the group consisting of RIS identification, one or more RIS states, and RIS state pattern requested for use by the UE with respect to the subject RIS, or a second parameter selected from the group consisting of target UE identification and information regarding communication via the subject RIS.

13. The UE of claim 11, wherein the scheduling information provides for time division multiple access (TDMA) of the subject RIS by the UE and one or more additional UEs also having transmitted a RIS request to the base station or provides for coordinated utilization of the subject RIS by the UE and utilization of at least one additional RIS by a UE of one or more additional UEs also having transmitted its RIS request to the base station.

14. The UE of claim 11, wherein the base station is configured to control the subject RIS on behalf of the UE in accordance with the scheduling information and the scheduling information informs the UE of granted RIS resources.

15. The UE of claim 11, wherein the scheduling information informs the UE of granted RIS resources and the UE controls the subject RIS in accordance with the scheduling information.

16. A method of wireless communication performed by a base station, the method comprising:

receiving a reconfigurable intelligent surface (RIS) request from a user equipment (UE) requesting use, control, or use and control of a subject RIS known to the UE facilitating communication between the UE and a target UE via the subject RIS, wherein the RIS request includes information regarding the subject RIS of the RIS request;

determining an aspect of utilization by the UE of the subject RIS of the RIS request; and transmitting a RIS response to the UE including an acceptance or rejection of the RIS request in accordance with the determining the aspect of utilization by the UE, wherein the RIS response comprises scheduling information regarding one or more scheduled resources with respect to the subject RIS.

17. The method of claim 16, wherein the RIS request includes one or more parameters with respect to the subject RIS, and wherein the one or more parameters include at least one parameter selected from the group consisting of time resources and frequency resources requested for use by the UE with respect to the subject RIS.

18. The method of claim 16, wherein the RIS request includes one or more parameters with respect to the subject RIS, and wherein the one or more parameters include at least one parameter selected from the group consisting of RIS identification, one or more RIS states, and RIS state pattern requested for use by the UE with respect to the subject RIS.

19. The method of claim 16, wherein the RIS request includes one or more parameters with respect to the subject RIS, and wherein the one or more parameters include at least one parameter selected from the group consisting of target UE identification and information regarding communication via the subject RIS.

20. A method of wireless communication performed by a base station, the method comprising:

receiving a reconfigurable intelligent surface (RIS) request from a user equipment (UE) requesting use, control, or use and control of a subject RIS known to the UE facilitating communication between the UE and a target UE via the subject RIS, wherein the RIS request includes information regarding the subject RIS of the RIS request;

determining an aspect of utilization by the UE of the subject RIS of the RIS request;

transmitting a RIS response to the UE including an acceptance or rejection of the RIS request in accordance with the determining the aspect of utilization by the UE;

receiving one or more RIS requests from one or more additional UEs requesting use, control, or use and control of the subject RIS by the one or more additional UEs, wherein the RIS request received from the UE and the one or more RIS requests received from the one or more additional UEs present conflicts for use of the subject RIS with respect to time resources, frequency resources, or a combination thereof;

reconciling the RIS request received from the UE and the one or more RIS requests received from the one or more additional UEs; and determining a scheduling grant for RIS resources with respect to the subject RIS.

21. The method of claim 16, wherein the scheduling information provides for time division multiple access (TDMA) of the subject RIS by the UE and one or more additional UEs also having transmitted a RIS request to the base station.

22. The method of claim 16, wherein the scheduling information provides for coordinated utilization of the subject RIS by the UE and utilization of at least one additional RIS by a UE of one or more additional UEs also having transmitted a RIS request to the base station.

23. The method of claim 16, further comprising:

controlling the subject RIS on behalf of the UE in accordance with scheduling information regarding one or more selected resources with respect to the subject RIS, wherein the scheduling information informs the UE of granted RIS resources.

24. The method of claim 16, wherein the scheduling information informs the UE of granted RIS resources and the UE controls the subject RIS in accordance with the scheduling information.

25. The method of claim 16, wherein the RIS response includes one or more parameters with respect to the subject RIS, and wherein the one or more parameters include at least one parameter selected from the group consisting of granted RIS identification and one or more allowed RIS states.

26. A base station comprising:

a processing system that includes at least one processor and memory coupled with the at least one processor, the processing system configured to cause the base station to:

receive a reconfigurable intelligent surface (RIS) request from a user equipment (UE) requesting use, control, or use and control of a subject RIS known to the UE facilitating communication between the UE and a target UE via the subject RIS, wherein the RIS request includes information regarding the subject RIS of the RIS request;

determine an aspect of utilization by the UE of a subject RIS of the RIS request; and transmit a RIS response to the UE including an acceptance or rejection of the RIS request in accordance with determining the aspect of utilization by the UE, wherein the RIS response comprises scheduling information regarding one or more scheduled resources with respect to the subject RIS.

27. The base station of claim 26, wherein the RIS request includes one or more parameters with respect to the subject RIS, and wherein the one or more parameters include a parameter selected from the group consisting of time resources and frequency resources requested for use by the UE with respect to the subject RIS, a first parameter selected from the group consisting of RIS identification, one or more RIS states, and RIS state pattern requested for use by the UE with respect to the subject RIS, or a second parameter selected from the group consisting of target UE identification and information regarding communication via the subject RIS.

28. A base station comprising:

a processing system that includes at least one processor and memory coupled with the at least one processor, the processing system configured to cause the base station to:

receive a reconfigurable intelligent surface (RIS) request from a user equipment (UE) requesting use, control, or use and control of a subject RIS known to the UE facilitating communication between the UE and a target UE via the subject RIS, wherein the RIS request includes information regarding the subject RIS of the RIS request;

determine an aspect of utilization by the UE of a subject RIS of the RIS request;

transmit a RIS response to the UE including an acceptance or rejection of the RIS request in accordance with determining the aspect of utilization by the UE;

receive one or more RIS requests from one or more additional UEs requesting use, control, or use and control of the subject RIS by the one or more additional UEs, wherein the RIS request received from the UE and the one or more RIS requests received from the one or more additional UEs present conflicts for use of the subject RIS with respect to time resources, frequency resources, or a combination thereof;

reconcile the RIS request received from the UE and the one or more RIS requests received from the one or more additional UEs; and determine a scheduling grant for RIS resources with respect to the subject RIS.

29. The base station of claim 26, wherein the processing system further causes the base station to:

control the subject RIS on behalf of the UE in accordance with scheduling information comprising one or more scheduling grants for RIS resources, wherein the scheduling information informs the UE of granted RIS resources.

30. The base station of claim 26, wherein the scheduling information informs the UE of granted RIS resources and the UE controls the subject RIS in accordance with the scheduling information.

* * * * *